May 30, 1939.　　　　L. LOCKWOOD　　　　2,160,481
FURNACE
Filed May 11, 1936　　2 Sheets-Sheet 2
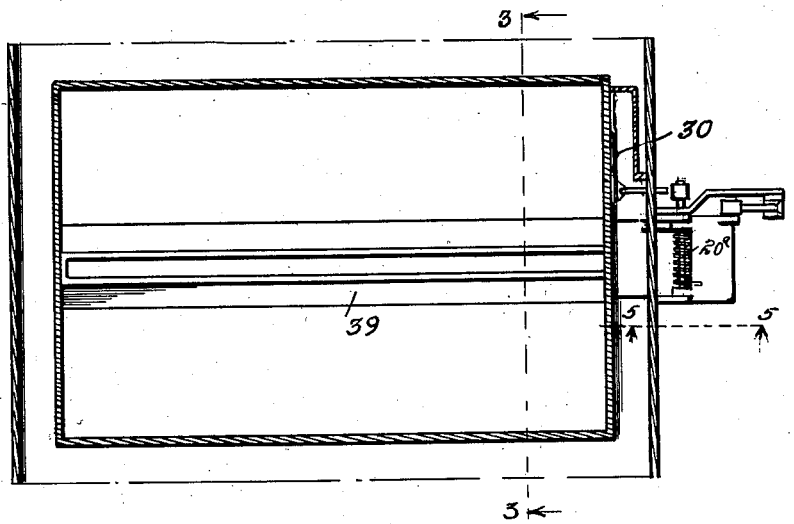
Fig.4.
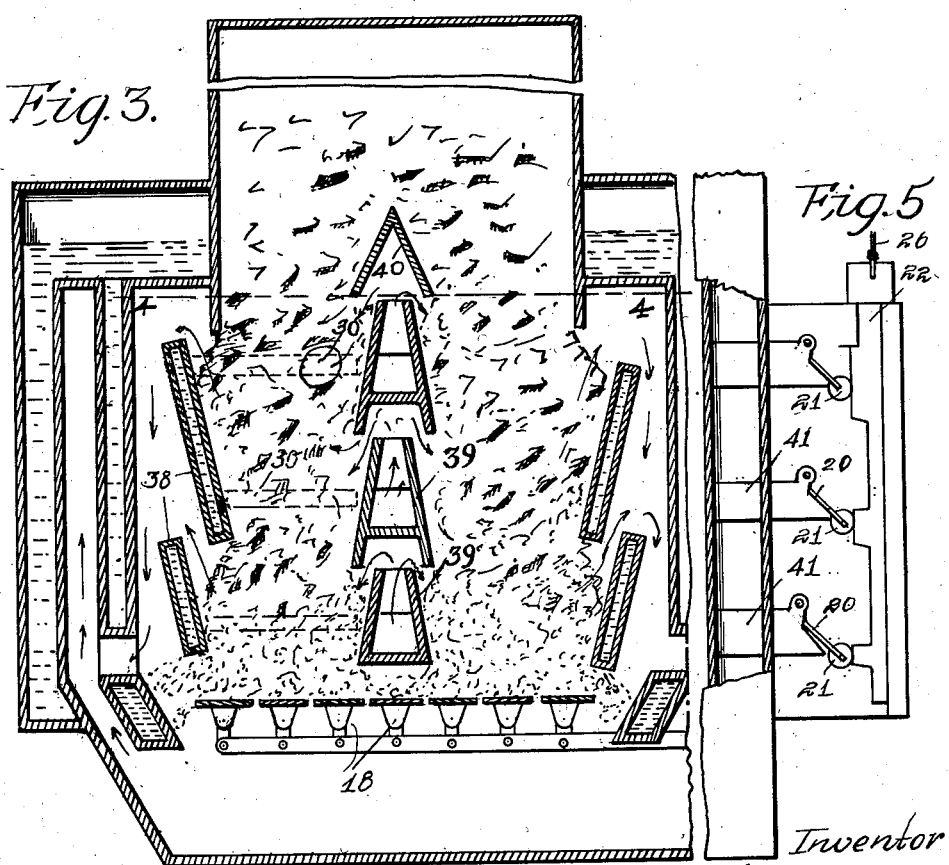
Fig.3.
Fig.5
Inventor
Lee Lockwood.
By Orwig & Hague Attys Patented May 30, 1939

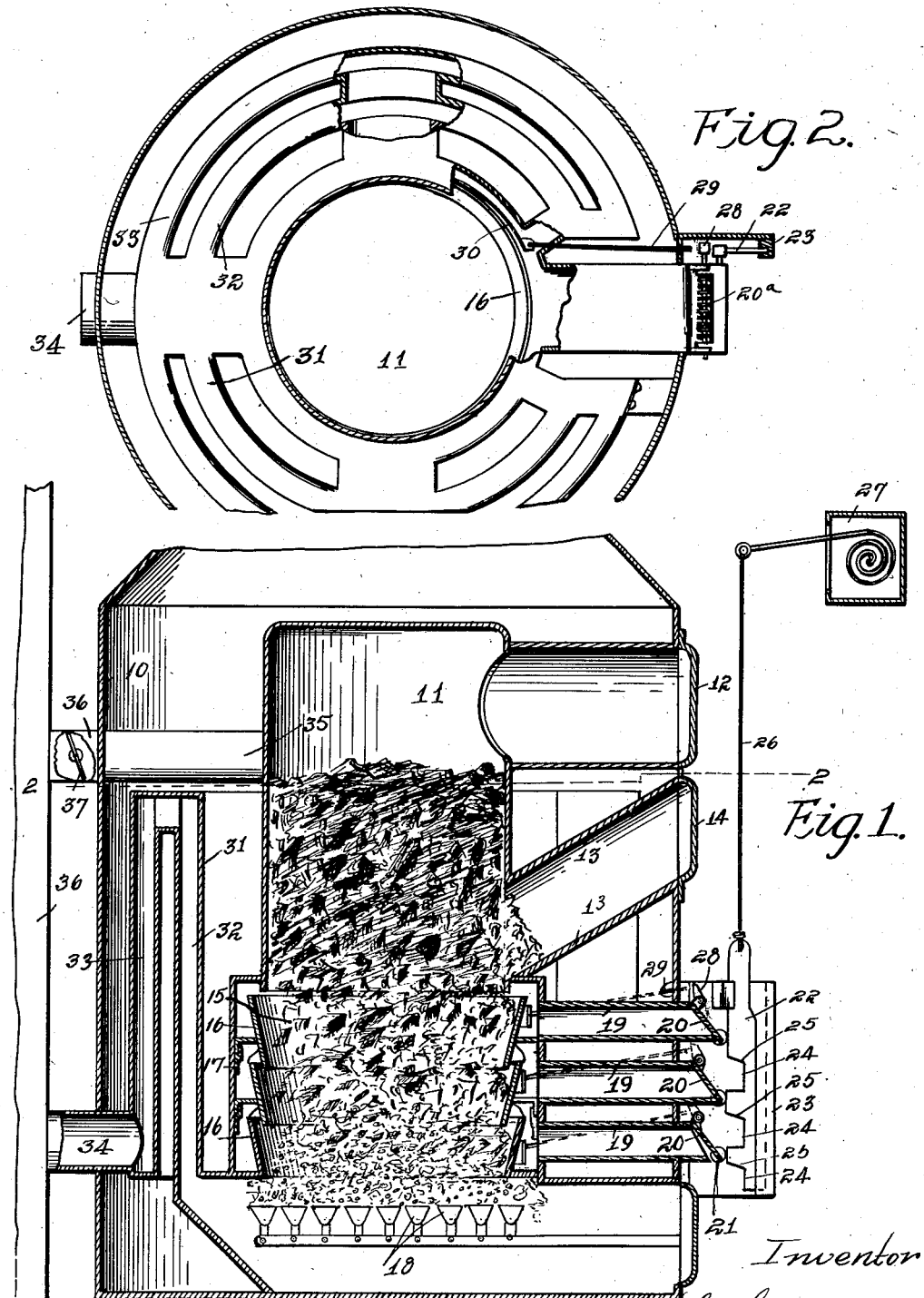

2,160,481

UNITED STATES PATENT OFFICE 2,160,481

FURNACE

Lee Lockwood, Des Moines, Iowa

Application May 11, 1936, Serial No. 79,080

3 Claims. (Cl. 110—84)

In the art of heating buildings with fuel such as coal, and when it is desired to deliver a relatively large amount of heat from a furnace, it is the present practice to simply increase the draft and burn the fuel more rapidly. It is well known to those skilled in the art that fuel, such as bituminous coal, burns at its maximum efficiency at a temperature of about 1600 degrees Fahrenheit and that when the fuel is burned rapidly and the temperature of the fuel being consumed is raised substantially above said temperature the fuel is rapidly reduced to ashes in a wasteful manner and without delivering, for heating purposes, a corresponding increase in temperature.

The object of my invention is to provide a furnace of simple, durable and inexpensive construction so designed that when a relatively small amount of heat is desired, a relatively small portion of the furnace combustion chamber will be given such an amount of draft as to produce economical combustion of a relatively small quantity of fuel and when progressively greater amounts of heat are desired, then draft is admitted to other portions of the fuel chamber to cause combustion of progressively greater quantities of fuel at efficient and economical temperature, as distinguished from the present method of increasing the speed of combustion in the same portion of the furnace.

A further object is to provide simple, durable and inexpensive means for automatically controlling draft passage ways to various portions of the combustion chamber, by the temperatures within said various portions as distinguished from such control by room temperatures, and whereby when the temperature of any given portion of the combustion chamber exceeds that at which efficient and economical combustion occurs the draft admitted to that particular portion will be reduced without affecting the draft delivered to other portions.

A further object is to provide a furnace of this character in which the various draft passage ways may be thermostatically controlled to thereby automatically increase or decrease the various portions of the combustion chamber that will be burning at a given time.

Figure 1 shows a vertical central sectional view of a furnace embodying my invention. Figure 2 shows a horizontal sectional view on the line 2—2 of Figure 1 with parts broken away to show structural details. Figure 3 shows a vertical sectional view of a furnace embodying my invention, illustrating a modified form, taken on the line 3—3 of Figure 4. Figure 4 shows a horizontal sectional view of the modified form shown in Figure 3 taken on the line 4—4 of Figure 3, and Figure 5 shows a detailed side elevation, partly in section, illustrating a modified form of draft control mechanism.

Referring to the accompanying drawings I have used the reference numeral 10 to indicate generally the furnace casing. Within the furnace casing is a fuel magazine 11, closed at its top and having a fuel door 12 for closing the entrance to the fuel magazine. A cylindrical wall 13 has one end open to the exterior of the furnace and it extends downwardly and its lower end is open to the lower part of the fuel magazine and the door 14 is provided for closing its upper end. This cylinder is provided for the purpose of giving the operator access to the interior of the combustion chamber and fuel magazine for the purpose of lighting a fire, etc.

At the bottom of the fuel magazine is the combustion chamber indicated generally by the reference numeral 15. There is a series of combustion chamber lining walls 16 attachably supported on brackets 17. These are circular in form and incline downwardly and inwardly as shown in Figure 1, so that air circulating spaces are provided between the lower end of the upper lining and the upper end of the next lining below it, and these linings, together with the wall of the combustion chamber 15, form air passageways. In these passageways this cool air tends to prevent the burning out of the linings and also the heated linings transmit part of their heat to the air and thereby promote efficient combustion of the fuel. Below the combustion chamber is a grate 18.

As illustrated in Figure 1, there are three draft passageway devices 19 which extend from the exterior of the furnace casing inwardly and through the wall of the combustion chamber 15. Each of these draft passageway devices 19 is provided with a hinged damper 20, normally retained open by spring 20a and each damper has a roller 21 at its outer end.

For the purpose of thermostatically controlling the dampers 20 I have provided a plate 22, slidingly supported in a frame 23 and provided with notches at 24, the upper edges of the notches being inclined upwardly and toward the center of the furnace at 25. This sliding plate is connected by a wire 26 with a thermostat of ordinary construction and illustrated generally by the reference numeral 27. In operation and assuming the plate 22 to be in the position shown in Figure 1 then all of the dampers 20 are held closed against tension of the springs 20a by the engagement of the rollers 21 with the inner edge of the plate 22. Preferably, however, the lower damper is so arranged that it is at no time fully closed as shown in Figure 1. When the plate 22 moves upwardly a short distance then the roller 21 of the lower damper 20 may enter the notch 24 at the bottom of the plate so that the lower damper 20 may be moved to open position by the spring 20a but the other dampers will still be held in closed position. When the plate 22 moves upwardly a further distance then the center one of the rollers 21 may move out into the second notch 24 and the second damper 20 may then be opened, and when the plate 22 moves upwardly another substantial distance, the upper damper may open. When the plate 22 moves downwardly from the last named position the upper inclined surface 25 will first close the top damper and then upon further downward movement the central damper will be closed, upon additional downward movement the lower damper 20 will be closed.

For the purpose of thermostatically controlling the temperature at various points within the combustion chamber, I have provided on each of the dampers 20 an upwardly extended arm 28 operated by rod 29 by means of a thermostat 30 of ordinary construction indicated generally by the reference numeral 30. This thermostat is preferably located between the wall of the lining 16 and the interior of the combustion chamber as shown in Figure 1 and each damper is provided with a similar thermostatic control device. In operation, when the heat adjacent any one of the thermostats 30 becomes too high then the thermostat operates to close the damper to which it is operatively connected and thereby shuts off the draft to that particular compartment of the combustion chamber to thereby reduce combustion at that point.

Between the combustion chamber and the outer furnace wall I have provided a hot air radiator of ordinary construction indicated generally by the reference numeral 31 and the products of combustion pass from the combustion chamber downwardly through the space between the grate and the lower combustion chamber lining 16 and then upwardly through the radiator at 32, then downwardly through the radiator at 33 and outwardly through the flue pipe 34. I have also provided a pipe 35 leading from the top of the fuel magazine to a flue pipe 36, provided with a damper 37 which is useful at times when starting a fire, but this damper is fully closed when the furnace is operating normally.

In practical use and after a fire has been started, I preferably completely fill the combustion chamber and fuel magazine with fuel such as bituminous coal. When conditions within the room require only a slight amount of heat, then only the lower one of the dampers 20 is opened, so that draft will enter through this lower opening and supply the necessary oxygen to burn the coal in the lower part of the combustion chamber only and the products of combustion will then pass from the lower part of the combustion chamber only in a downward direction and out to the flue. Under these conditions fuel above the lower lining 16, or the lower compartment of the combustion chamber, will not ignite the fuel immediately above it. When, however, this burning fuel is reduced to ashes the fuel above it will move downwardly by gravity and into the path of the fresh oxygen and it will become ignited and burn and this will continue until the entire amount of fuel in the magazine has been consumed. In the event, however, that the room temperature conditions require greater amount of heat, then the second damper from the bottom is opened, this will provide a supply of fresh air to that part of the fuel contained within the central one of the linings 16, and with this supply of fresh oxygen the fuel contained in the central compartment of the combustion chamber will become ignited from the burning coal in the lower compartment and it will then burn in the ordinary manner and the products of combustion will pass downwardly above the grate to the flue, and when room temperature conditions require maximum heat, the upper damper 20 is opened and the fuel in all three of the compartments will burn at the same time, thus producing a maximum amount of heat for this particular furnace.

The dampers 20 may, if desired, be controlled by hand. I have, however, provided means for automatically controlling them thermostatically in the manner before described.

It is generally recognized by those schooled in the art of heating with fuels, such as bituminous coal, that the maximum efficiency is attained when the temperature at the combustion point is kept at 1600 degrees Fahrenheit, more or less. This most efficient temperature varies considerably with different kinds of coal. I find it highly desirable to keep the temperature at the point of combustion below the fusing point of the ashes or other unconsumed products to thereby prevent the formation of clinkers. With the furnaces now in use and when room temperatures require relatively a small amount of heat this may be attained by having only a limited amount of draft permitted to enter the combustion chamber and in that manner the temperatures are kept below 1600 degrees Fahrenheit. In such furnaces, however, when room temperatures require a maximum amount of heat then relatively greater quantities of air must be admitted to the same combustion compartment and the temperatures within the combustion chamber rapidly rise to a point substantially above 1600 degrees Fahrenheit and the fuel is rapidly consumed and wasted without any correspondingly great increase in heat given off by the furnace.

With my improved furnace and when maximum heat is required, additional compartments within the combustion chamber are ignited and, hence, it is not necessary to burn the fuel so rapidly as the mass being burned has increased in volume, hence, under these conditions it is not necessary to permit any part of the mass of burning fuel to become heated above the 1600 degrees Fahrenheit or desired maximum.

By the term "below the normal fuel level", as employed in the accompanying claims I mean below the top of the unconsumed fuel in the particular compartment of the combustion chamber then under consideration.

I claim as my invention:

1. An improved furnace, comprising a fuel magazine, a series of combustion compartments arranged one above the other, the uppermost one being positioned below the fuel magazine and all of the combustion compartments being open at their upper and lower portions to permit fuel to move by gravity downwardly through them, a grate below the lowermost combustion compartment, independent damper-controlled means for admitting air for combustion purposes to the upper portion of each combustion compartment, means for enclosing said combustion compartments against the admission of air for combustion purposes except through said damper-controlled means, a flue leading from the lower compartment, said members being so constructed and positioned relative to each other that when all of said damper-controlled means are open, air may enter each compartment from the upper portion and pass downwardly through the compartment and into the upper portion of the compartment below and finally to the flue, and whereby combustion may occur in all of the combustion compartments, and if the damper-controlled means for the upper combustion chamber is closed, combustion of fuel therein will be rapidly discontinued without interfering with combustion in a lower combustion compartment in which the damper-controlled means is open.

2. An improved furnace, comprising a furnace casing, a grate, a combustion chamber above the grate, a fuel magazine above the combustion chamber, a series of combustion compartment linings arranged one above the other and defining said combustion chamber and forming independent combustion compartments arranged one above the other, the uppermost one being positioned below the fuel magazine and all of the combustion compartments being open at their upper and lower portions to permit fuel to move by gravity downwardly through them, a grate below the lowermost combustion compartment, independent damper-controlled means for admitting air for combustion purposes to the upper portion of each combustion compartment, means for enclosing said combustion compartments against the admission of air for combustion purposes except through said damper-controlled means, a flue leading from the lowermost compartment, said members being so constructed and positioned relative to each other that when all of said damper-controlled means are open, air may enter each compartment from its upper portion and pass downwardly through the compartment and into the upper portion of the compartment below and finally to the flue, and whereby combustion may occur in all of the combustion compartments, and if the damper-controlled means for an upper combustion chamber is closed, combustion of fuel therein will be rapidly discontinued without interfering with combustion in a lower combustion compartment in which the damper-controlled means is open.

3. An improved furnace, comprising a furnace casing, a grate, a combustion chamber above the grate, a fuel magazine above the combustion chamber, a series of combustion compartment linings arranged one above the other and defining said combustion chamber and forming independent combustion compartments arranged one above the other, the uppermost one being positioned below the fuel magazine and all of the combustion compartments being open at their upper and lower portions to permit fuel to move by gravity downwardly through them, a grate below the lowermost combustion compartment, independent damper-controlled means for admitting air for combustion purposes to the upper portion of each combustion compartment, means for enclosing said combustion compartments against the admission of air for combustion purposes except through said damper-controlled means, a flue leading from the lowermost compartment, said members being so constructed and positioned relative to each other that when all of said damper-controlled means are open, air may enter each compartment from its upper portion and pass downwardly through the compartment and into the upper portion of the compartment below and finally to the flue, and whereby combustion may occur in all of the combustion compartments, and if the damper-controlled means for an upper combustion chamber is closed, combustion of fuel therein will be rapidly discontinued without interfering with combustion in a lower combustion compartment in which the damper-controlled means is open, and a device for operating said damper-controlled means which when moved in one direction will close first the damper for an upper combustion chamber and then progressively the next below, and when operated in the other direction will permit the opening of first a lower damper and then progressively the next above.

LEE LOCKWOOD.